United States Patent
Shastri et al.

(10) Patent No.: US 8,067,052 B2
(45) Date of Patent: Nov. 29, 2011

(54) NUTRITIONAL COMPOSITION AND A CONTAINER FOR THE CONVENIENT TRANSPORT AND STORAGE OF THE NUTRITIONAL COMPOSITION

(76) Inventors: Siddharth Shastri, Los Angeles, CA (US); Kevin M. Connolly, Culver City, CA (US)

(*) Notice: Subject to any disclaimer, the term of this patent is extended or adjusted under 35 U.S.C. 154(b) by 994 days.

(21) Appl. No.: 11/065,843

(22) Filed: Feb. 25, 2005

(65) Prior Publication Data
US 2006/0193961 A1    Aug. 31, 2006

(51) Int. Cl.
*A23D 9/00* (2006.01)
(52) U.S. Cl. ......... 426/601; 426/602; 426/604; 426/605
(58) Field of Classification Search .................. 426/601, 426/602, 604, 605
See application file for complete search history.

(56) References Cited

U.S. PATENT DOCUMENTS

| | | | |
|---|---|---|---|
| 4,316,919 | A | 2/1982 | Pelloso et al. |
| 5,346,709 | A * | 9/1994 | Myhre .......................... 426/111 |
| 5,510,100 | A | 4/1996 | Picard et al. |
| 6,015,833 | A | 1/2000 | Saebo et al. |
| 6,077,525 | A | 6/2000 | Vanderhoek |
| 6,242,621 | B1 | 6/2001 | Jerome et al. |
| 6,420,577 | B1 | 7/2002 | Reaney et al. |
| 6,440,931 | B1 | 8/2002 | Remmereit et al. |
| 6,465,666 | B2 | 10/2002 | Jerome et al. |
| 6,524,527 | B2 | 2/2003 | Fimreite et al. |
| 6,558,941 | B2 | 5/2003 | Zuelli et al. |
| 6,576,666 | B2 | 6/2003 | Hermelin et al. |
| 2005/0013907 | A1 * | 1/2005 | Depierris et al. .......... 426/330.2 |
| 2006/0057187 | A1 * | 3/2006 | Eskuchen et al. ............. 424/439 |

FOREIGN PATENT DOCUMENTS
WO    WO 2004/075647 A1 * 10/2004

OTHER PUBLICATIONS

Albers, R., Van der Wielen, R.P.J., Brink E.J., Hendricks, H.F.J., Dorovska-Taran, V.N., and Mohede, I.C.M. Effects of cis-9, trans-11 and trans-10, cis-12 conjugated linoleic acid (CLA) isomers on immune function in healthy men. European J. Clinical Nutrition (2003) 57:595-603.

* cited by examiner

*Primary Examiner* — Brent O'Hern
(74) *Attorney, Agent, or Firm* — McCarter & English LLP

(57) ABSTRACT

The present invention relates to a combination of a hermetically sealed, substantially air-tight container and a nutritional composition. The container of the present invention is adapted for the convenient transport, and storage of a single daily oral dose of a nutritional composition containing a fatty acid, for example, diacyl glycerol, an octadecatrienoic acid, an octadecadienoic acid, linolenic acid, linoleic acid, conjugated linoleic acid (CLA) or a combination thereof. In a preferred embodiment, the present invention relates to the use of the c9, t11 and t10, c12 isomers of CLA in a nutritional composition. The wide range of health benefits associated with consumption of these CLA fatty acids is well known. Furthermore, the invention relates to a container that substantially prevents CLA lipid oxidation caused by exposure to air.

3 Claims, 5 Drawing Sheets

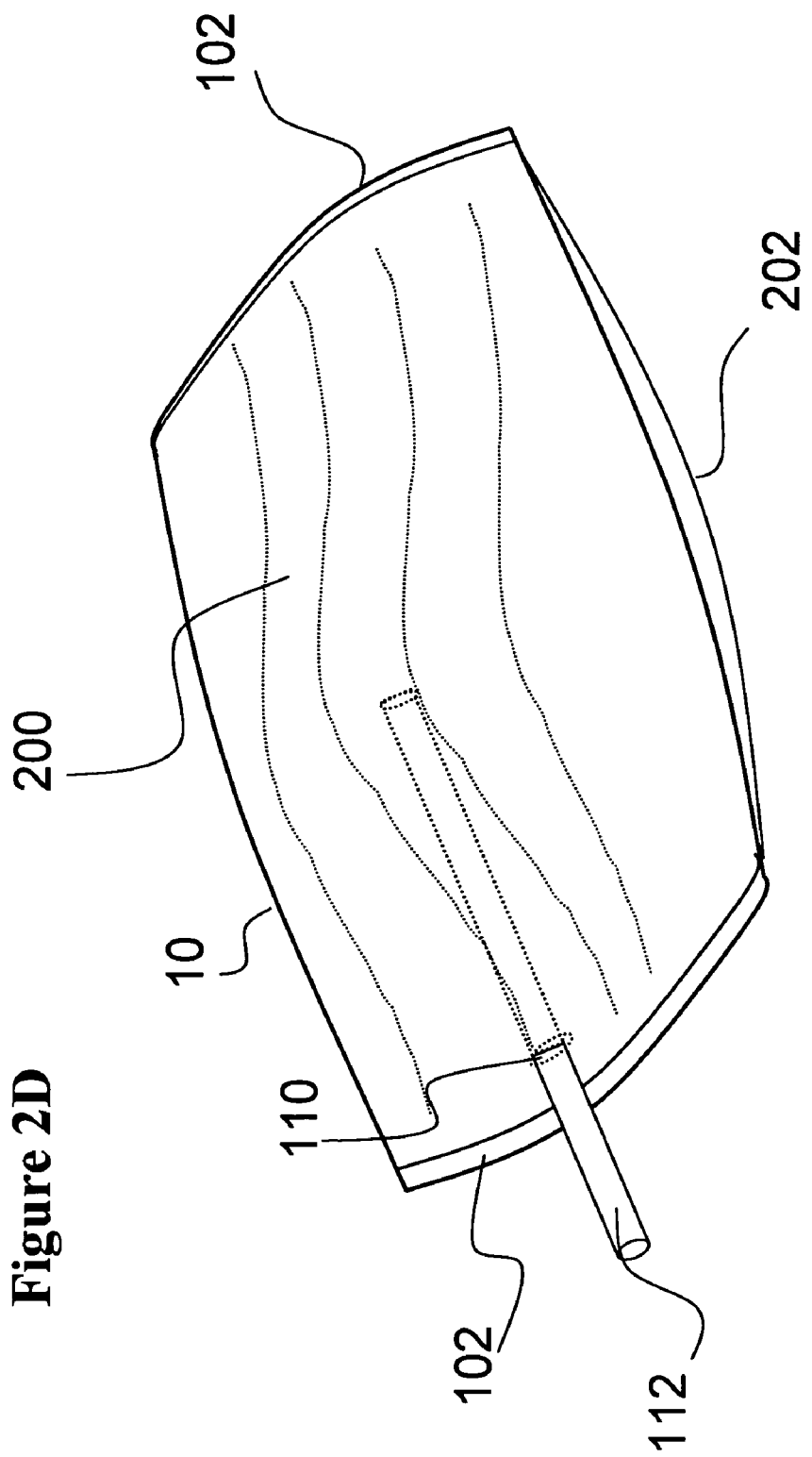

NUTRITIONAL COMPOSITION AND A CONTAINER FOR THE CONVENIENT TRANSPORT AND STORAGE OF THE NUTRITIONAL COMPOSITION

FIELD OF THE INVENTION

The present invention relates, in one aspect, to a nutritional composition containing an entire single daily oral dose of a fatty acid, for example, octadecadienoic fatty acids, octadecatrienoic fatty acids, other C18 fatty acids, diacyl glycerol, linolenic acid, linoleic acid, conjugated fatty acids, for example, conjugated linoleic acid (CLA), a CLA-containing triacylglyceride or a combination thereof. In particular, the present invention relates to a nutritional composition containing the c9, t11 and t10, c12 isomers of CLA in an emulsion. The invention also relates to a nutritional composition contained in a hermetically sealed, substantially air-tight container to prevent degradation of the fatty acid by exposure to oxygen. The container may be adapted for the convenient transport and storage of the nutritional composition, and may be sized to contain an entire single daily oral dose of a nutritional fatty acid.

BACKGROUND OF INVENTION

Conjugated linoleic acid (CLA) is the general term used to refer to a class of positional isomers of the omega-6 essential fatty acid octadecadienoic acid or linoleic acid. CLA contains conjugated double bonds (i.e. double carbon bonds separated by a single carbon bond). CLA is found naturally in the meat and dairy foods derived from ruminant animals where it is produced by the anaerobic bacteria, Butyrivibrio fibrisolvens, which is present in the rumen of these animals. However, CLA comprises a relatively minor proportion of the total fatty acid content contained in meats or dairy products (e.g. only about 0.5% per gram of fat). Although CLA occurs naturally in relatively small amounts, it is commonly produced industrially through the partial hydrogenation of linoleic acid purified from sources such as safflower or sunflower. As discussed in U.S. Pat. No. 6,015,833 entitled "Conjugated Linoleic Acid Compositions," the use of sunflower and safflower oil is preferred because of their high native 9, 12 linoleic acid content, and also because they have low levels of contaminating residues that can result in a less pure product.

Since the discovery of CLAs by researchers at the University of Wisconsin in 1978, most attention has been directed towards two particular CLA isomers, the cis-9, trans-11 (c9, t11) CLA and trans-10, cis-12 (t10,c12) CLA isomers. The interest in these two isomeric species of CLA is related to the beneficial biological effects associated with their consumption. Some of the biologically advantageous activities that have been attributed to the consumption of c9, t11 CLA and t10, c12 CLA isomers include anticarcinogenic activity, antiatherogenic activity, and antidiabetic activity. In addition, it has been reported that consumption of CLA can decrease an individual's body fat to body mass ratio, and several studies have reported that CLA has beneficial effects on certain aspects of immune system function.

Interestingly, several studies of the physiological effects of CLA suggest that the health benefits are mediated differentially by specific CLA isomers. For example, studies have shown that c9, t11 CLA can enhance growth in rodents, but only t10, c12 CLA was shown to decrease blood lipoproteins, and triacylglyerides in hamsters and affect lean body mass in mice. Furthermore, in vitro experiments using preadipocytes indicate that only the t10, c12 CLA isomer was able to inhibit lipoprotein lipase activity, inhibit stearyl CoA desaturase activity, increase peroxisome proliferator activated receptor expression, and increase lipid oxidation.

For adult humans the daily required amount of CLA has been reported in various studies to be between about 80 milligrams to as much as about 50 grams per day. Because the typical diet does not provide this amount of CLA, dietary supplements are used to increase CLA intake to the desired or recommended level. Although various delivery means have been used, the most widely used and commonly marketed forms of CLA supplements are either liquid compositions, or ingestible capsules or tablets composed of gelatin or cellulose that contain 500-750 milligrams of CLA per tablet. However, these forms of CLA have several important limitations which make them undesirable. For example, because of the relatively large daily doses of CLA that may be required (e.g. about 3 grams or more per day for adults), individuals are faced with the undesirable choice of consuming a large volume of a liquid containing CLA, having to swallow relatively large capsules or tablets, having to swallow many capsules or tablets per day, or a combination thereof. Additionally, in many cases the transport of a large volume of liquid or a large number of capsules necessitates that the individual carries a bulky, inconvenient and/or cumbersome container, and have a ready supply of water or other liquid to assist in consuming the supplement.

Furthermore, the prior forms of CLA supplements are generally exposed to air during storage or use, particularly when provided in containers having multiple doses of the supplement. Exposure to air results in oxidation of the CLA fatty acids, which alters their structure, reduces or eliminates their beneficial properties, and reduces their shelf-life. To ameliorate the effects of oxidation, CLA is typically packaged with one or more chemical antioxidants, for example, lecithin, tocopherols, ascorbate, or ascorbyl palmitate. However, the inclusion of antioxidants results in added costs to the manufacturer, and because of the progressive oxygen exposure, only offers a limited extension of the overall shelf-life.

It is an object of the present invention to overcome one or more of the above-described drawbacks or disadvantages of the prior art. Accordingly, the present invention provides a nutritional composition comprising CLA in an emulsion. The composition may also contain one or more substances to enhance the flavor or texture of the composition, or to provide additional nutrients. The nutritional composition may be manufactured in a manner to minimize the effects or exposure of the CLA to oxygen, and the composition may be hermetically sealed in a container, such as for example a foil pouch, for transportation and storage. Additionally, the container may be sized to contain a single daily dose of CLA.

SUMMARY OF THE INVENTION

As used herein, "fatty acid" refers to any member of the family of naturally occurring or synthetically produced hydrocarbons containing a carboxylic acid, and at least one saturated, unsaturated, partially unsaturated, or conjugated carbon-carbon bond. Furthermore, the term fatty acid is used generally to describe fatty acids, C18 fatty acids, conjugated fatty acids, lipids, phospholipids, oils, fats, triacylglycerides, fatty acid derivatives, diacyl glycerol, isoprenoids, sphingolipids, glycerolipids, and the like.

As used herein, "conjugated linoleic acid" or "CLA" refers to an octadecadienoic acid, octadecatrienoic acid, conjugated linolenic acid or conjugated linoleic acid, including a single isomer, a mixture of two or more isomers, naturally occurring, synthetic, or semi-synthetically produced octadecadienoic acids, triacylglycerides of CLA or any combination of thereof.

As used herein, "triacylglycerides of CLA" means a molecule containing an isomer of CLA at any or all three positions on the glycerol backbone (e.g. sn-1, sn-2, and sn-3) bound, for example by an ester linkage to a hydroxyl group.

The present invention is directed towards a nutritional composition comprising a fatty acid, for example, CLA, in an emulsion. The nutritional composition of the invention may contain, for example, various proportions of the c9, t11 CLA isomer, and t10, c12 CLA isomer. The CLA may take the form of free CLA or bound through ester linkages to a glycerol backbone, for example, an oil containing triacylglycerides. In one embodiment, an emulsion of CLA in water is formed and stabilized using an appropriate emulsifier. Additional ingredients may be added to provide desired qualities in the product, such as, for example, additives which will cause the nutritional composition to have an attractive or pleasing taste, have a prolonged shelf-life, or additives that provide additional nutrients, for example, vitamins, minerals, herbal extracts, and the like.

To minimize oxidation of the fatty acid, the nutritional composition may be packaged, stored and transported in a hermetically sealed container that contains the nutritional composition emulsion. The nutritional compositions may be prepared in a substantially air or oxygen free condition, placed in the container, and hermetically sealed to prevent exposure of the nutritional composition to oxygen. The container may be made from a material, such as a foil, which is substantially impermeant to air so that there is no substantial oxidative damage to the CLA, thereby substantially extending the mixture's shelf-life and substantially preserving the beneficial properties of the CLA. In one embodiment, the volume inside the container is substantially the same as the volume of the nutritional composition contained therein, such that substantially no air spaces exist within the container.

It is also contemplated that the hermetically sealed container may be sized to contain substantially an entire daily oral dose of CLA, obviating the need for an individual to consume excessive quantities of a CLA-containing liquid or swallow numerous large capsules several times per day. In one embodiment, the container is substantially sturdy and flexible, for example a plastic bag, or a foil packet such as is used with food condiments. In this form the nutritional composition is substantially more convenient to transport, store, and use.

Among the advantages of the invention is that the CLA can be made, stored and transported in a manner which substantially increases the shelf-life of the fatty acid-containing nutritional composition, and may substantially decrease or eliminate the requirement for the addition of preservatives. Another advantage is that the nutritional composition may be provided in a substantially concentrated form, which would allow for easy consumption of an entire daily oral dose. These advantages are given by way of example and are in no way intended to be limiting. Other advantages of the present invention will become apparent to those skilled in the art in view of the following detailed description of preferred embodiments.

DESCRIPTION OF THE DRAWINGS

FIG. 2D. Is a perspective view of another embodiment of the present invention of FIG. 1.

DESCRIPTION OF THE PREFERRED EMBODIMENTS

Figure 1:
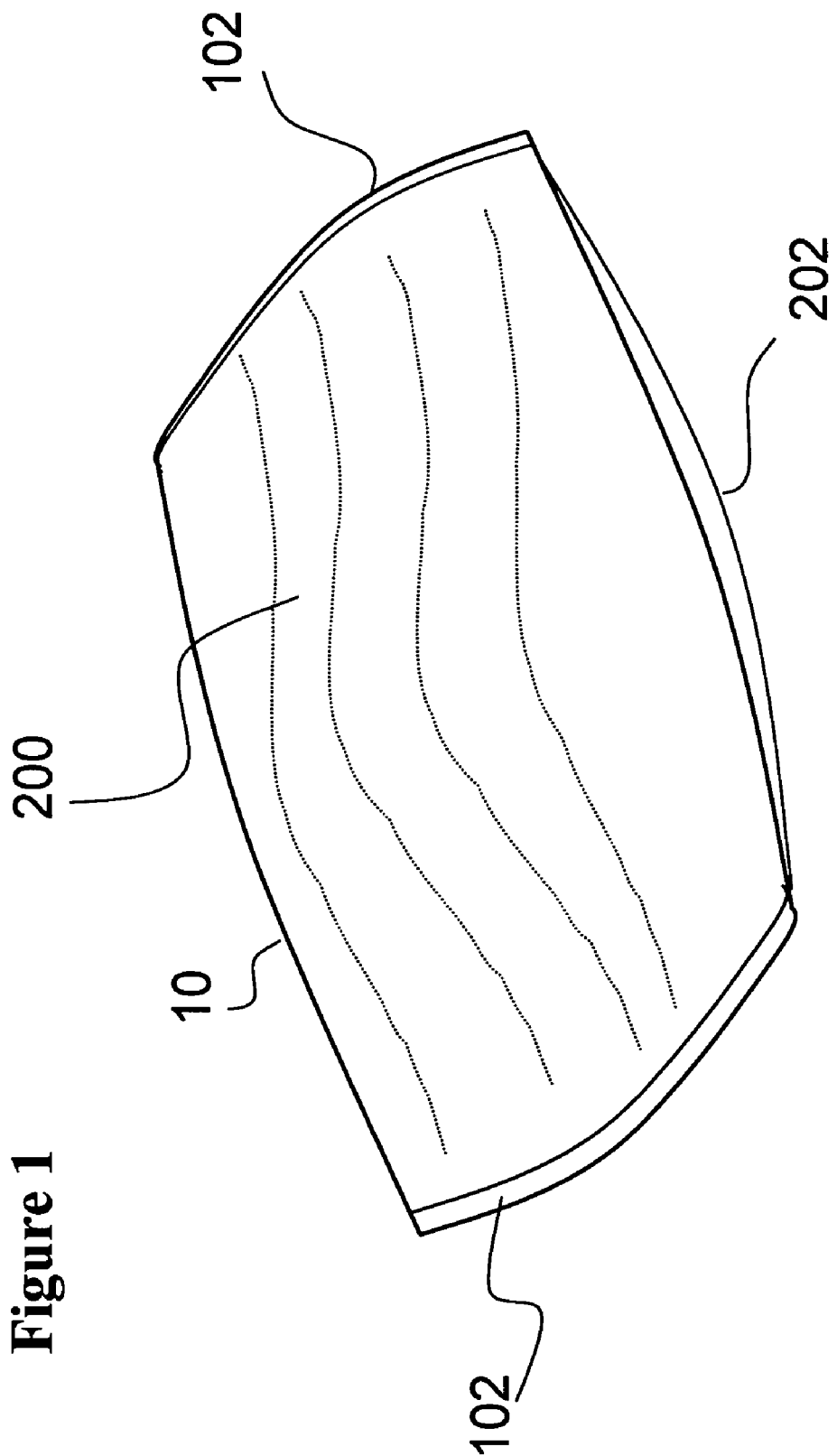
FIG. 1. Is a perspective view of the preferred embodiment of the container of the present invention.

In one aspect, the present invention is directed towards a nutritional composition containing a fatty acid, for example diacyl glycerol or an ocatdecadienoic acid, for example, CLA. Preferably, the CLA present in the composition is predominantly comprised of the cis-9, trans-11 (c9, t11) CLA isomer, the trans-10, cis-12 (t10, c12) CLA isomer or a combination thereof. A high quality c9, t11/t10, c12 CLA formulation, for example Clarinol G-80™, may be used in the composition, and is commercially available from Loders Croklaan, Inc. (Channahon, Ill.). Clarinol G-80™ contains about 75% by weight c9, t11 and t-10, c12 CLA. The invention is not limited in this regard, however, and the composition may contain any mixture of the isomers of CLA. The CLA is preferably provided in the form of an oil, such as, for example, the CLA derived from the partial hydrogenation of linoleic acid purified from safflowers or sunflowers.

In one embodiment, the nutritional composition is provided in the form of an oil-in-water emulsion. To reduce the amount of oxygen present in the composition, the water may be made substantially air free, for example through boiling under conditions of negative pressure, such as under a vacuum. The oil-in-water emulsion is made using any appropriate technique for producing an oil-in-water emulsion known to those skilled in the art. Preferably, the emulsion is made in an inert atmosphere to prevent oxygen from being entrained in the emulsion. For example, the emulsion may be produced in a nitrogen atmosphere.

The nutritional composition preferably comprises between about 5% to about 50% by weight water, between about 40% and about 80% by weight of a fatty acid, for example, CLA, and an emulsifier. Additional components may be added to the nutritional composition to improve the taste or consistency of the composition, or to provide additional nutrients. Examples of additional additives include citric acid, glycerine, potassium sorbate, beta carotene, sweeteners, flavoring, and gamma tocopherol.

In a preferred embodiment, the nutritional composition contains from about 15% to about 40% by weight water, between about 50% and about 75% by weight of a fatty acid, for example, CLA, and between about 1% and about 20% of an emulsifier to maintain the CLA-in-water emulsion. Using the proportions described results in a composition which is more viscous than water alone, and reduces the total volume of the composition required to provide a single daily oral dose of a fatty acid. As discussed above, the nutritional composition may contain additional components such as, for example, citric acid, glycerine, potassium sorbate, beta carotene, sweeteners, flavoring and gamma tocopherol, to impart additional desired characteristics or nutrients to the composition.

In a particularly preferred embodiment of the invention, the nutritional composition contains the following components:
CLA about 63% by weight
Water about 26% by weight
Emulsifier about 9% by weight
Citric Acid about 0.3% by weight
Potassium Sorbate about 0.1% by weight
Gamma Tocopherol about 0.2% by weight The remaining proportion, up to 100%, is comprised of additives, for example, sweetener, flavoring, and optionally beta-carotene.

A composition as described will contain from about 1 gram to about 3 grams of CLA in a packet weighing approximately 4 grams, which can provide an adequate daily dietary supplement of CLA for many individuals. By preparing an emulsion of the fatty acid content in an aqueous environment, oiliness of the composition is masked, and dispersion of the nutritional composition in the saliva and gastric juices is promoted. The emulsifier used in the nutritional composition may be, for example, soy lecithin, phophotidylcholines, egg lecithin, egg yolk, casein, sodium caseinate, gum Arabic, xanthan gum, Aquazome™, a proprietary micro-emulsion containing Gum Tragacanth, pure orange extract, Xanthan gum, lecithin and stevia, and any combination thereof. The invention is not limited in this regard, and any appropriate emulsifier known to those skilled in the art may be used in the composition.

It is desirable to prepare the nutritional composition in a manner which minimizes exposure of the fatty acid to oxygen during preparation and storage. As described below, the composition may be packaged in a hermetically sealed container to prevent exposure to oxygen during transportation and storage. Minimizing the oxygen content and exposure of the nutritional composition reduces or prevents oxidation and degradation of the CLA in the composition.

Figure 2A:
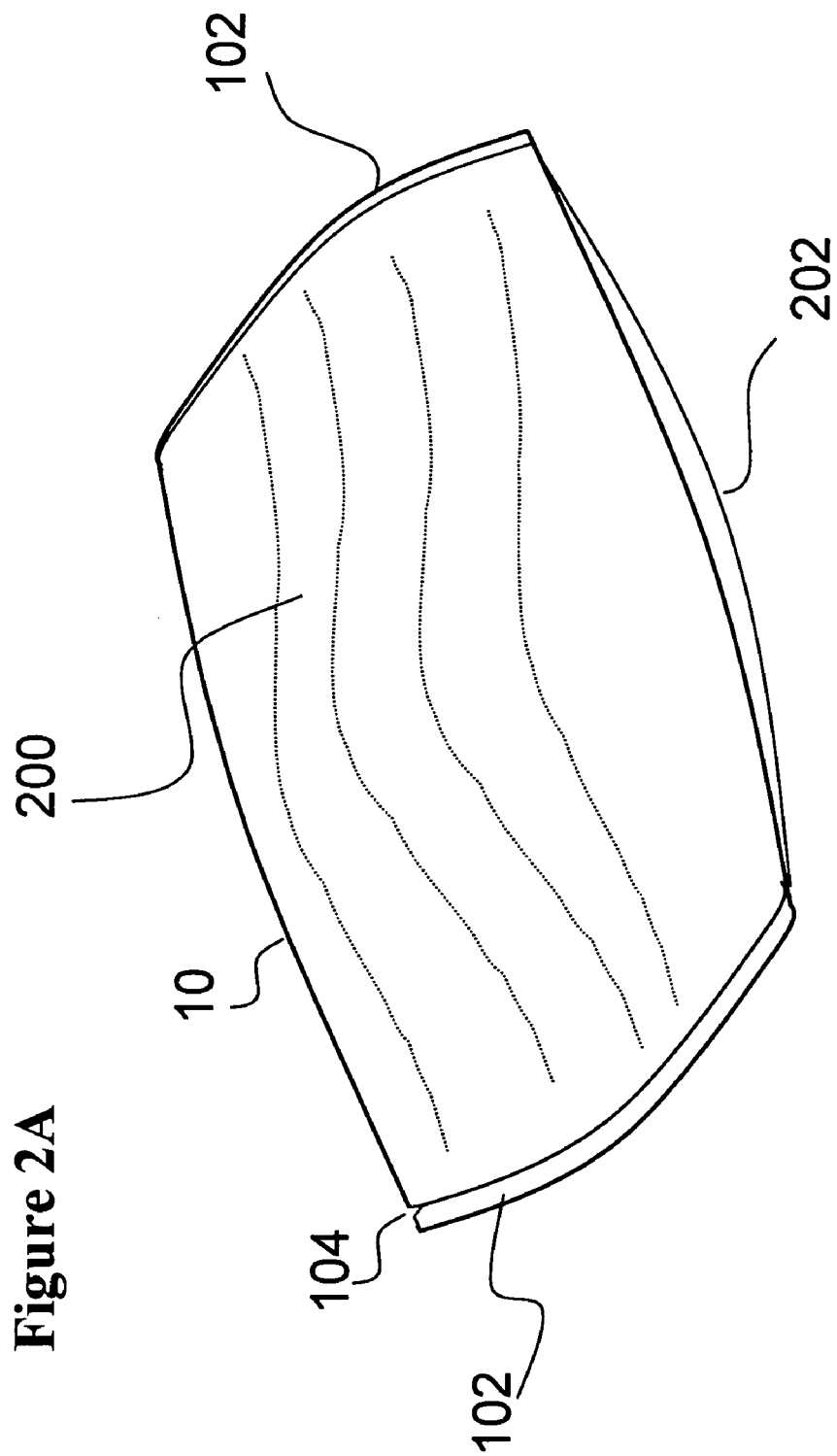
FIG. 2A. Is a perspective view of another embodiment of the present invention of FIG. 1.
Figure 2B:
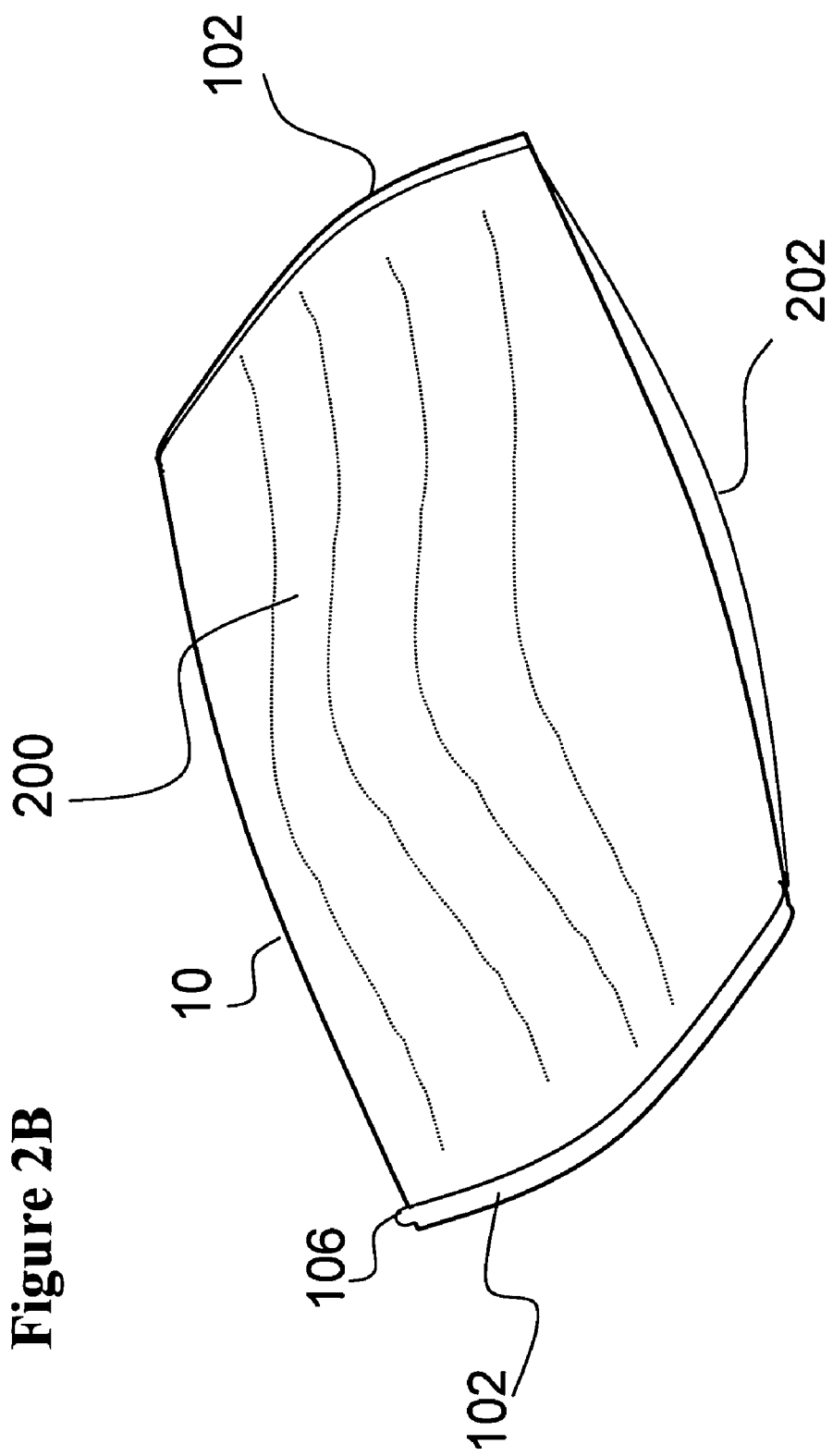
FIG. 2B. Is a perspective view of another embodiment of the present invention of FIG. 1.
Figure 2C:
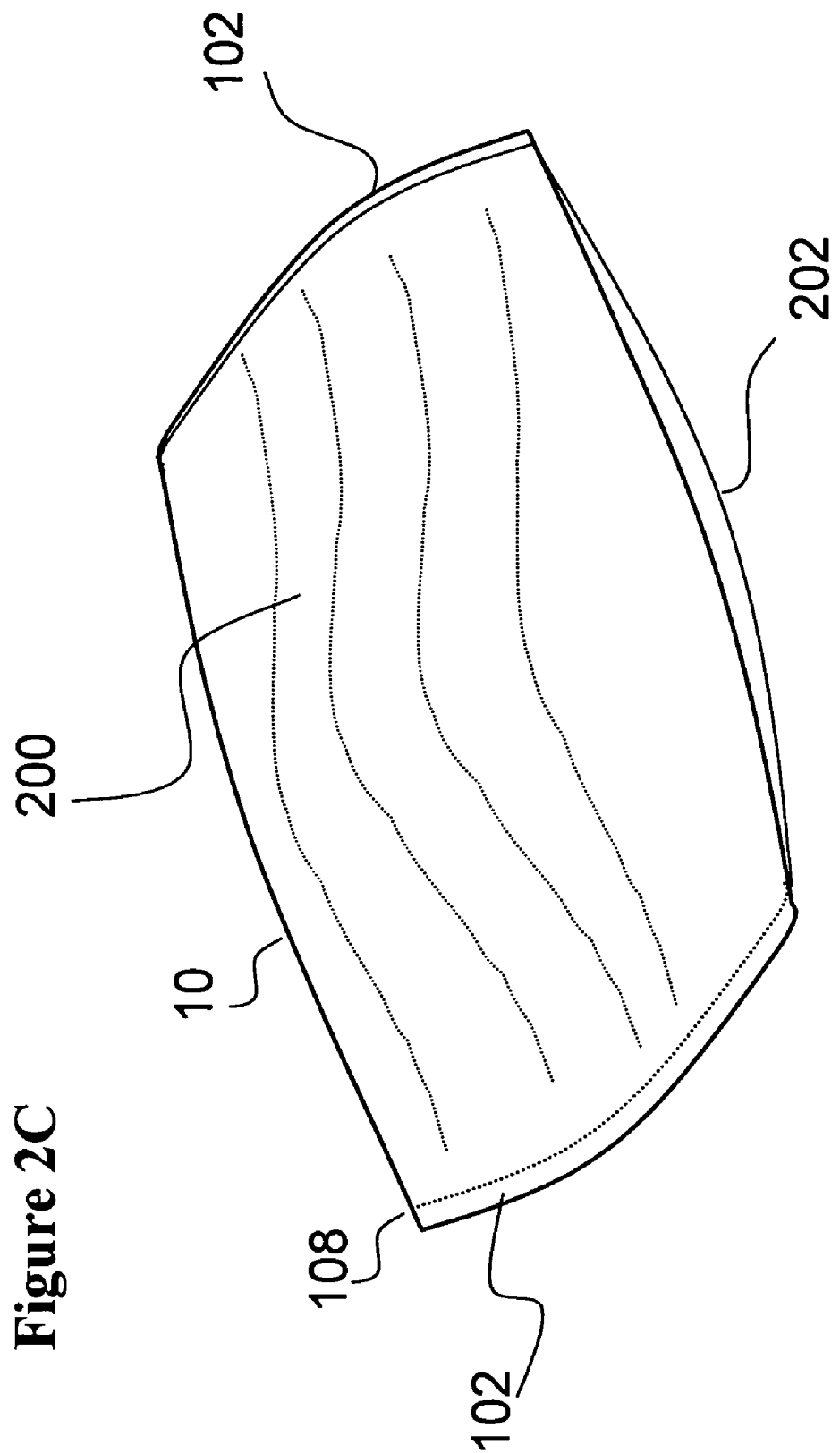
FIG. 2C. Is a perspective view of another embodiment of the present invention of FIG. 1.

In another aspect of the present invention, the nutritional composition described above is provided in a hermetically sealed container to minimize the exposure of the composition to oxygen. Referring now to FIGS. 1-2D, a container 10 is used for storage or for transport of the nutritional composition. In a preferred embodiment the container 10 comprises, a body portion comprising a first face 200, and a second face 202, with at least one hermetically sealed edge portion 102. In a preferred embodiment the container 10 is formed from a prefabricated, substantially tubular material, which is cut to the desired size, and the two open ends are hermetically sealed after receiving the nutritional composition resulting in the formation of two sealed edge portions 102 (FIG. 1). However, it will be understood by one of ordinary skill that these embodiments are given by way of example only and are not intended to limit the scope of the present invention.

In another embodiment the body portion 100 of the container 10 may be comprised of a flexible, liquid impervious material, for example plastic. In a preferred embodiment the container 10 may be a foil packet similar to those used for transport and storage of food condiments. In still another embodiment the container 10 is in the form of a sealed bag or a pouch. However, as will be understood by one of ordinary skill, the container 10 may be of any suitable shape, size, or color. Additionally, while the container 10 of the preferred embodiment may be constructed out of flexible plastic or foil, it will be recognized by one of ordinary skill that this is not absolutely required. The container 10 may be constructed of any of various materials, and be any of various degrees of rigidity, so long as the substantial air-resistant transport of a nutritional composition is possible.

In other embodiments the container 10 may also include an opening means at one end of the container 10 such that the contents are easily accessible. For example, the container 10 may contain a small cut 104 (FIG. 2A), a tab 106 (FIG. 2B), perforations 108 (FIG. 2C) or a combination thereof near the top of one edge on the first side 200, the second side 202 or both, allowing a person to open the container 10 by pulling on the container material, and tearing the container 10 open approximately above the location of the opening means. In another embodiment (FIG. 2D) the container 10 is supplied with a plastic straw 112, which is received in an area in the body of the container 10, which is adapted for receiving the straw 110, allowing an individual to draw out substantially the entire volume of the nutritional composition via the straw. However, as will be understood by one of ordinary skill, the container 10 may include any type of suitable opening means located in any portion of the container that is adapted for accessing the nutritional composition, and that the embodiments are given by way of example and are not intended to be limiting or exclusive.

As will be understood by those of ordinary skill in the pertinent art based on the teachings herein, numerous changes may be made to the above-described and other embodiments of the invention without departing from its scope as defined in the appended claims. For example, the relative quantities of the ingredients may be varied to achieve different desired effects, additional ingredients may be added, and/or similar ingredients may be substituted for one or more of the ingredients described. Accordingly, this detailed description of preferred embodiments is to be taken in an illustrative rather than a limiting sense.

What is claimed is:

1. A combination comprising:
   a composition comprising an amount of conjugated linoleic acid (CLA) sufficient to constitute a daily dose for an adult human, wherein from about 75% to 100% by weight of the total CLA is at least one of the c9, t11 isomer, the t10, c12 isomer or a combination of both, substantially air free water, and an emulsifier selected from the group consisting of lecithin, phosphatidylcholines, egg yolk, casein, sodium caseinate, gum Arabic, xanthan gum, gum tragacanth, and any combination thereof, wherein said CLA, water, and emulsifier are combined to form an oil-in-water emulsion, and wherein said CLA comprises between about 40% to about 80% by weight, water comprises between about 5% to about 50% by weight and the emulsifier comprises up to about 20% by weight of the nutritional composition, and
   a hermetically sealed container, wherein the composition is contained within the hermetically sealed container.

2. The combination of claim 1, wherein said CLA comprises between about 50% to about 75% by weight, water comprises between about 15% to about 40% by weight and the emulsifier comprises up to about 10% of the nutritional composition.

3. The combination of claim 1, wherein the composition further comprising citric acid, glycerine, potassium sorbate, beta carotene, sweetener, flavoring, gamma tocopherol or any combination thereof.

* * * * *